(12) United States Patent
Lombari

(10) Patent No.: US 7,303,091 B2
(45) Date of Patent: *Dec. 4, 2007

(54) EXPANSION TANK WITH DOUBLE DIAPHRAGM

(75) Inventor: Robert Lombari, N. Smithfield, RI (US)

(73) Assignee: Flexcon Industries, Randolph, MA (US)

( * ) Notice: Subject to any disclaimer, the term of this patent is extended or adjusted under 35 U.S.C. 154(b) by 480 days.

This patent is subject to a terminal disclaimer.

(21) Appl. No.: 10/828,980

(22) Filed: Apr. 21, 2004

(65) Prior Publication Data

US 2005/0017016 A1    Jan. 27, 2005

Related U.S. Application Data

(60) Provisional application No. 60/489,644, filed on Jul. 24, 2003, provisional application No. 60/489,061, filed on Jul. 22, 2003, provisional application No. 60/489,056, filed on Jul. 22, 2003.

(51) Int. Cl.
  *B65D 1/32*  (2006.01)
  *B65D 6/12*  (2006.01)

(52) U.S. Cl. ......................... 220/721; 138/30
(58) Field of Classification Search ............... 220/720, 220/721, 723; 285/203, 204, 205; 138/30, 138/39
See application file for complete search history.

(56) References Cited

U.S. PATENT DOCUMENTS

| | | | | |
|---|---|---|---|---|
| 3,247,999 A | * | 4/1966 | Stilwell | 383/127 |
| 4,784,181 A | * | 11/1988 | Hilverdink | 138/30 |
| 6,264,247 B1 | * | 7/2001 | Lombari et al. | 285/202 |
| 6,343,622 B1 | * | 2/2002 | Keijzer et al. | 138/39 |
| 2004/0173624 A1 | * | 9/2004 | Carter | 220/720 |

* cited by examiner

*Primary Examiner*—Anthony D. Stashick
*Assistant Examiner*—Harry A Grosso
(74) *Attorney, Agent, or Firm*—Stacy L. Blasberg; Sam Pastermack; Choate Hall & Stewart LLP

(57) ABSTRACT

A double-diaphragm bladder. The bladder comprises a non-flexible diaphragm having a peripheral edge and a flexible diaphragm having a peripheral edge. The non-flexible diaphragm has an aperture adapted and constructed to be connected to a liquid port, and the peripheral edges of the non-flexible diaphragm and the flexible diaphragm are sealed together. The bladder is suitable for use in an expansion tank.

8 Claims, 4 Drawing Sheets

EXPANSION TANK WITH DOUBLE DIAPHRAGM

This application claims the priority of U.S. Provisional Applications Nos. 60/489,061, filed Jul. 22, 2003, 60/489,056, filed Jul. 22, 2003, and 60/489,644, filed Jul. 24, 2003, the contents of each of which are incorporated herein by reference.

FIELD OF THE INVENTION

This invention pertains to a diaphragm expansion tank and exemplary flow-through connectors therefor.

BACKGROUND OF THE INVENTION

Expansion tanks are known for use in flow systems for controlling flow of liquid under varying pressures. Generally, expansion tanks comprise an essentially cylindrical or spherical housing containing a bladder-type diaphragm which divides areas of a liquid and a pressurized gas. For a general discussion of expansion tanks and bladder-type diaphragms, see U.S. Pat. No. 4,784,181 to Hilverdink entitled "Expansion Tank with a Bladder-Type Diaphragm".

An expansion tank generally has one nozzle through which liquid flows in and out depending on the pressure level controlled by the contraction and expansion of the interior diaphragm. Many municipalities require that expansion tanks for use with potable water include devices to ensure that water circulates through the tank and that there is not actually stagnant water in the tank when the tank is "empty".

SUMMARY OF THE INVENTION

In one aspect, the invention is a bladder. The bladder includes a non-flexible diaphragm having a peripheral edge and an aperture adapted and constructed to receive a flow-through connector, and a flexible diaphragm having a peripheral edge. The peripheral edges of the non-flexible diaphragm and the flexible diaphragm are sealed to one another to form a circumferential seam. The peripheral edges of the non-flexible and flexible diaphragms may be heat sealed to each other. The bladder may further include a clench ring. Where a clench ring is used, the peripheral edge of the non-flexible diaphragm includes a circumferential recess and the peripheral edge of the flexible diaphragm includes a circumferential rib. The circumferential recess meshes with the circumferential rib and the peripheral edges of the non-flexible diaphragm and the flexible diaphragm are clamped together by the clench ring.

In another aspect, the invention is an expansion tank. The expansion tank includes an outer shell having a side wall and opposite end walls, a flow-through connector, and a bladder disposed within the outer shell. The bladder includes a non-flexible diaphragm having a peripheral edge and a flexible diaphragm having a peripheral edge. The non-flexible diaphragm is positioned between the flow-connector and the flexible diaphragm and having an aperture which is connected to either the outer shell or the flow-through connector such that the flow-through connector provides fluidic communication between an exterior of the expansion tank and an interior of the bladder. The peripheral edges of the non-flexible diaphragm and the flexible diaphragm are sealed to one another to form a circumferential seam, and a space within the bladder is fluidicly isolated from a space between the bladder and the outer shell.

The flow-through connector may include a nipple having first and second end. The first end has a plurality of tabs that are manipulable between an insertion position and a securing position to secure the nipple to the bladder. The flow-connector may further include a first retainer ring fixedly attached to the nipple and disposed between the bladder and the outer shell, a second retainer ring disposed about the nipple and within the bladder, a first o-ring disposed between the first retainer ring and the bladder, and a second o-ring disposed between the second retainer ring and the bladder. In the securing position the tabs press the second retainer ring towards the first retainer ring to create a seal preventing fluidic communication between an interior of the bladder and a space between the bladder and the outer shell.

In an alternative embodiment, the flow-through connector includes a non-rotating flow guidance element defining a central high pressure inflow channel, a low pressure outflow channel disposed concentrically about the central inflow channel, and a contoured path through which water passes out of the inflow channel into the bladder and containing a plurality of inlets into the low pressure outflow channel having a total cross sectional area less than or equal to the total cross sectional area of the inflow channel. When the flexible diaphragm rests against the cap, the bladder is essentially empty, and the tank is adapted and constructed to circulate water such that a first portion of water entering the tank leaves the tank before a second portion of water entering the tank after the first portion of water leaves the tank. The plane of an inlet opening of the high pressure in flow channel may be oriented perpendicular to that of an outlet opening of the in flow channel.

Optionally, in the embodiment where the bladder includes a clench ring that clamps the peripheral edges of the flexible and non-flexible diaphragms together, the plane formed by the clench ring may be perpendicular to the center line of the expansion tank. The housing of the tank may include inward projections that lie in a plane that is perpendicular to the center line of the expansion tank and is at a distance from the liquid port such that the clench ring of the bladder is between the liquid port and the plane in which the inward projections lie. Typically, the inward projections project inward enough to prevent movement of the clench ring along the center line of the expansion tank but do not project inward enough to significantly prevent expansion of the second diaphragm.

BRIEF DESCRIPTION OF THE DRAWING

The invention is described with reference to a particular embodiment shown in the figures. The embodiment in the figures is shown by way of example and is not meant to be limiting in any way.

DETAILED DESCRIPTION

Figure 1:
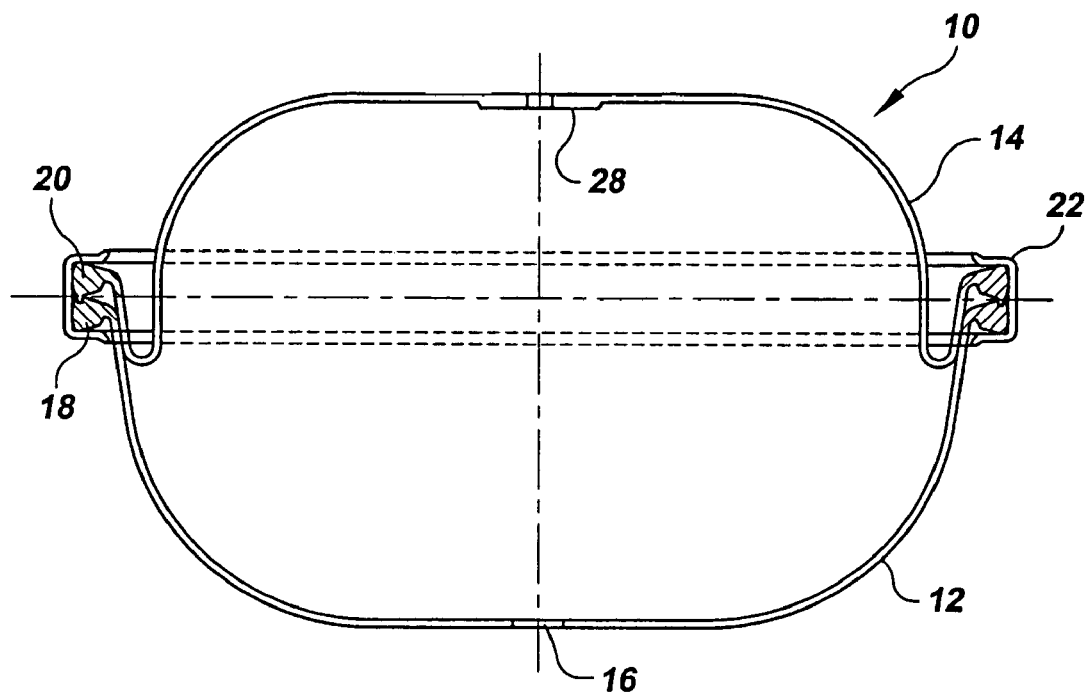
FIG. 1 is a diagram of a particular embodiment of the bladder of the invention.
Figure 2:
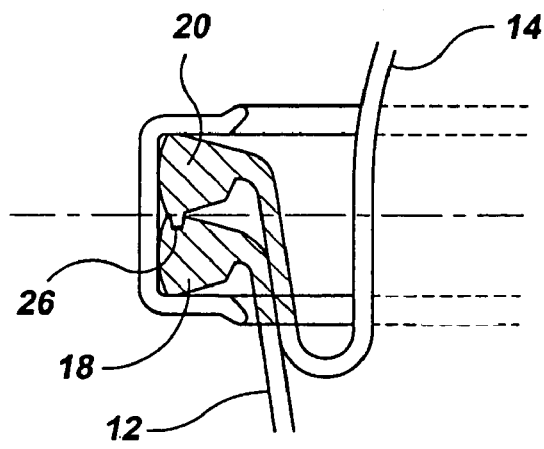
FIG. 2 is an enlarged view of a portion of FIG. 1.
Figure 2A:
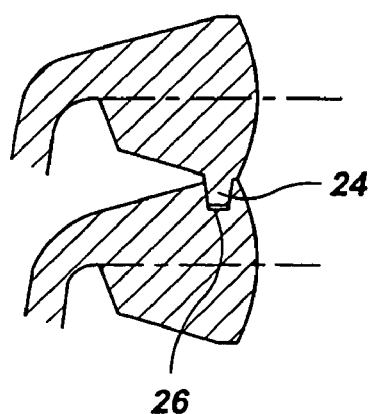
FIG. 2A is an enlarged view of a portion of FIG. 1.

A bladder 10 is shown in an expanded state in FIG. 1. Bladder 10 includes a first non-flexible diaphragm 12 and a second flexible diaphragm 14. The bladder is also provided with an aperture 16. The peripheral edges 18 and 20 of the first and the second diaphragms, respectively, are connected to each other to form a seal. In the embodiment shown (see also FIG. 2) the peripheral edges 18 and 20, which project to the outside, lie against each other and are clamped together by a clench ring 22. As shown in FIG. 2A the peripheral edge 20 of the flexible diaphragm 14 is provided with a circumferential rib 24 that meshes with a circumferential recess 26 on the peripheral edge 18 of the non-flexible diaphragm 12 in order to obtain a seal.

In an alternative embodiment, the peripheral edges of the non-flexible diaphragm 12 and flexible diaphragm 14 are heat sealed together. In this embodiment, it is not necessary for the peripheral edges of the diaphragms to be clamped together or to have a circumferential rib or groove.

The non-flexible diaphragm may be produced from a polymer that is relatively stiff. When the bladder 10 is used to hold potable water, the polymer is preferably approved for use with food or is non-toxic, non-carcinogenic, and non-mutagenic and does not leach such materials into the water. Exemplary materials for use in producing the non-flexible diaphragm 12 include but are not limited to polypropylene, teflon, nylon, polyalkylene terephthalate, polyformaldehyde, polystyrene, poly(methyl methacrylate), polycarbonate, and poly(hexylisocyanate).

The second flexible diaphragm may be produced from a resilient, flexible polymer. When the bladder 10 is used to hold potable water, the polymer is preferably approved for use with food by the appropriate government agency or is non-toxic, non-carcinogenic, and non-mutagenic and does not leach such materials into the water. Exemplary materials for use in producing the flexible diaphragm 14 include but are not limited to isobutylene, polybutadiene, poly(dimethylsiloxane), poly(cis-1,4-isoprene), poly(trans-1,4-isoprene), and thermoplastic elastomers.

Figure 3:
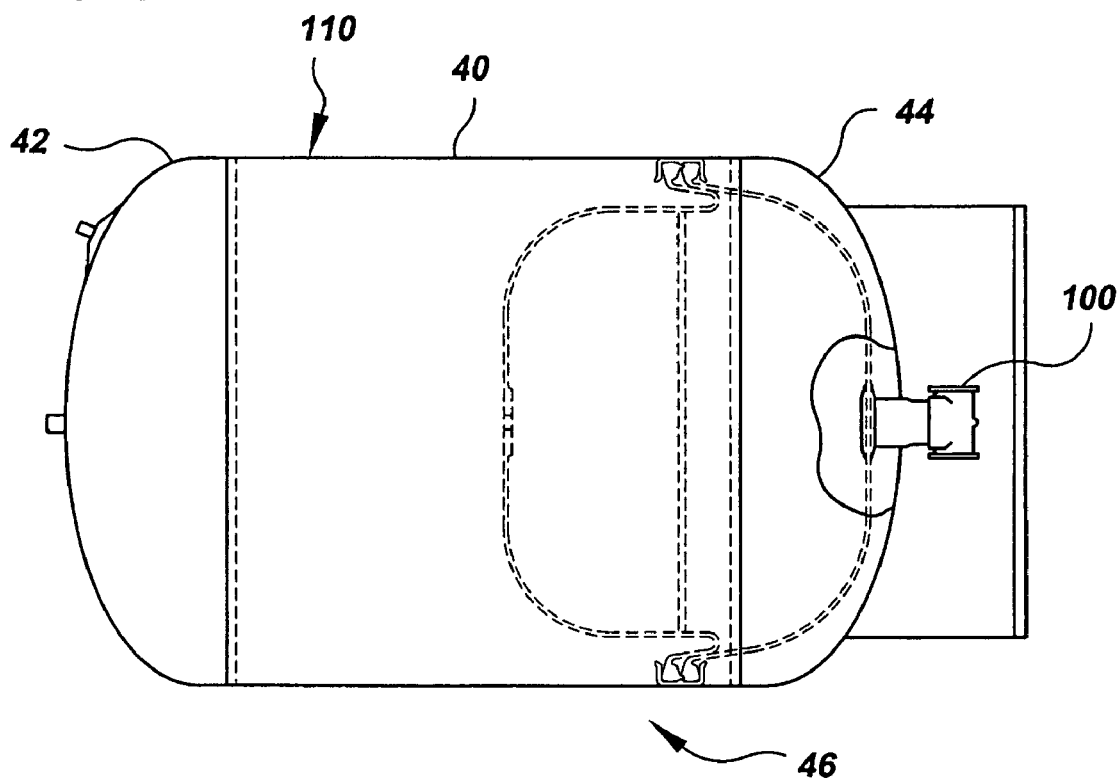
FIG. 3 is a schematic illustration of an expansion tank according to one embodiment of the invention.

The bladder 10 of the invention is suitable for use in an expansion tank. An exemplary tank 110 includes a central portion 40 that defines a side wall of tank 110. Central portion 40 is capped by first dome 42 and second dome 44 to make an outer shell 46 (FIG. 3). Those skilled in the art will also recognize that outer shell 46 may be formed out of two domes welded together or in other configurations. The bladder 10 sits within outer shell 46. When empty, the pressure of gas between outer shell 46 and bladder 10 causes flexible diaphragm 14 to collapse against non-flexible diaphragm 12.

Figure 4A:
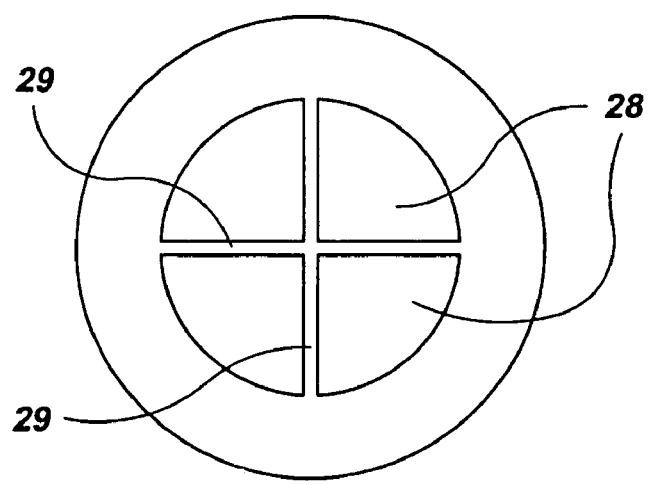
FIG. 4A is a schematic illustration of a portion of the bladder shown in FIG.
Figure 4B:
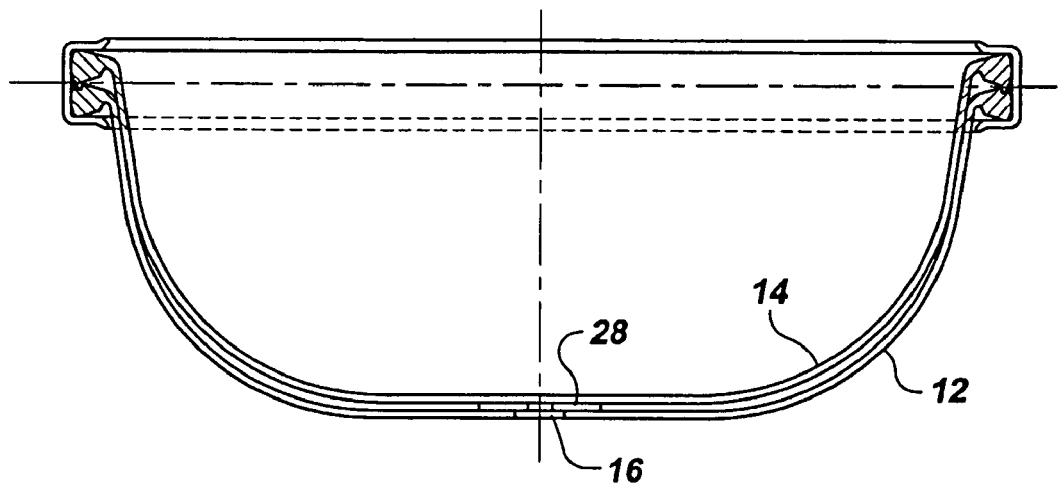
FIG. 4B is a schematic illustration of the bladder depicted in FIG. 1 in its collapsed state.

In one embodiment, in order to prevent the flexible diaphragm 14 from fully closing the aperture 16 of the non-flexible diaphragm 12 when the liquid is expelled from the bladder 10, the flexible diaphragm 14 is provided on the inside, at the point opposite the aperture 16, with a number of raised pads 28 (FIG. 4A), between which the liquid can flow from the aperture 16 into the bladder through grooves 29. The pads 28 prevent the development of a vacuum between the two diaphragms. FIG. 4B shows the bladder 10 depicted in FIG. 1 in its collapsed state. When liquid enters the bladder 10, it exerts pressure on the inside of the bladder and causes the flexible diaphragm 14 to expand. This expansion compresses the gas in the space between the flexible diaphragm 14 and the outer shell 46. When the liquid pressure inside the bladder 10 is less than the pressure of the gas, the gas expands and pushes against the flexible diaphragm 14, causing it to collapse against non-flexible diaphragm 12 and expel the liquid. The operation of diaphragm expansion tanks is well known to those skilled in the art and is described in U.S. Pat. No. 4,784,181.

To pass into bladder 10, water must pass through an opening in outer shell 46 and aperture 16 of non-flexible diaphragm 12. A flow-through nozzle attachment that passes through outer shell 46, for example, through second dome 44, and is sealingly attached to non-flexible diaphragm 12 at one end and to a pipe or other apparatus at the other end allows water to flow from the pipe into and out of the bladder 10 without entering the space between bladder 10 and outer shell 46. An exemplary flow-through nozzle attachment for use with bladder 10 is described in U.S. Pat. No. 4,784,181, and those skilled in the art will be familiar with other flow-through attachments that are appropriate for use with the invention. In an alternative embodiment, the flow-through nozzle attachment 120 depicted in FIG. 5 may be employed.

Figure 5:
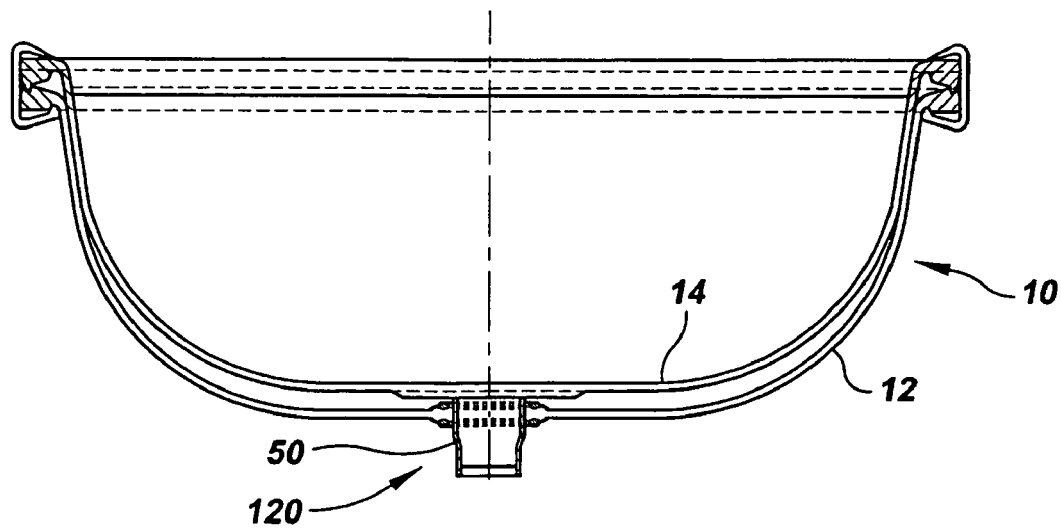
FIG. 5 is a cross-sectional illustration of a flow-through nozzle attachment for attaching a nipple to a diaphragm according to one embodiment of the invention.
Figure 5A:
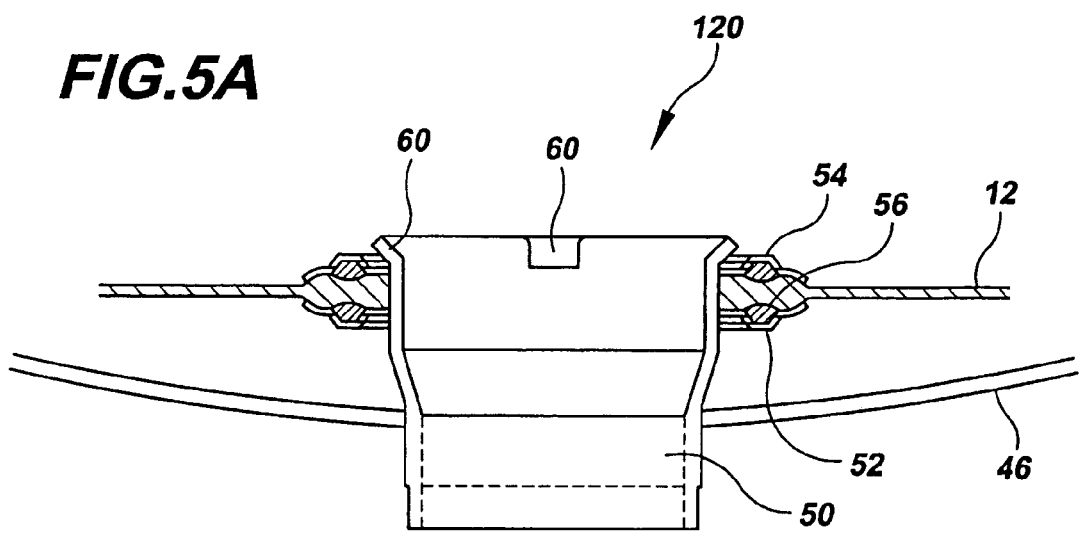
FIG. 5A is an enlarged view of the flow-through nozzle attachment shown in FIG. 5.

As shown in FIG. 5 and in larger scale in FIG. 5A, nipple 50 extends through non-flexible diaphragm 12 to allow liquid to pass into bladder 10. As shown in FIG. 5A, nipple 50 is positioned to extend through outer shell 46. Within outer shell 46, the nipple 50 further extends through first retainer ring 52 and second retainer ring 54 that secure bladder 10 therebetween. O-rings 56 are used as sealing devices at the interfaces of the bladder 10 with first retainer ring 52 and second retainer ring 54. The nipple 50 is welded to first retainer ring 52 on the side closest to the outer shell 46. In one embodiment, the o-rings 56 are made of Viton® and the nipple 50 and retainer rings 52 and 54 are made of stainless steel.

The nipple 50 includes, at one end, at least one tab 60 that may be made of the same material as the nipple 50. Tabs 60 may be an integral portion of nipple 50. FIG. 5 illustrates three such tabs 60; a fourth is not shown. The tabs 60 are designed to be manipulable to secure the end of the nipple 50 in place. After insertion of the nipple 50 through the first retainer ring 52, bladder 50, and second retainer ring 54, the tabs 60 are folded over in a position to contact the outer rim of the second retainer ring 54 and to secure the nipple 50 against second retainer ring 54. Once the nipple 50 is in place, liquid can pass through it into bladder 10 without leaking into the space between outer shell 46 and bladder 10.

One skilled in the art will recognize that flow-through nozzle attachment 120 may also be used with prior art bladders and diaphragm tanks, not just the inventive bladders described herein. Flow-through nozzle attachment 120 may be used to connect an expansion tank, for example, expansion tanks employing bladder 10, to a system in which there is a quantity of liquid, such as a water pipe system or a hot water supply system.

Where the bladder is used to hold potable water, it is desirable to promote circulation of water through the bladder 10 so that water enters and leaves the bladder on a "first-in-first-out" (FIFO) basis rather than a "last-in-first-out" (LIFO) basis. Even if the circulation of water is imperfect, that is, water enters and leaves the bladder on some combination of FIFO and LIFO, increased circulation reduces the time that water is resident in the bladder and prevents the water from becoming stagnant. Exemplary flow diverters that may be used to promote water circulation include that disclosed by U.S. Pat. No. 6,343,622, and additional diverters are well-known to those skilled in the art.

Figure 6:
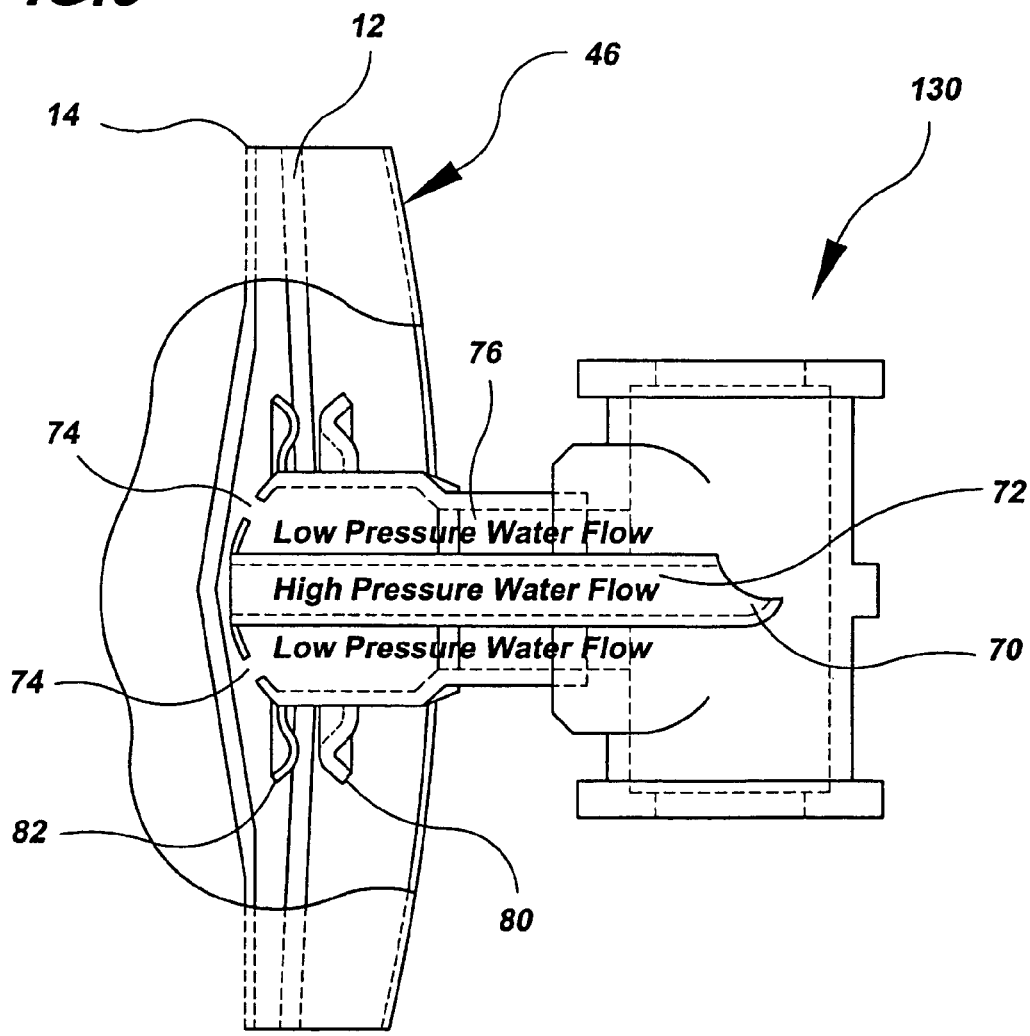
FIG. 6 is a schematic view of a flow-through diverter device according to an embodiment of the invention.

In an alternative embodiment, the bladder 10 is used with a flow diverter 130 as shown in FIG. 6. A flow guidance element 70 of the flow-through diverter device 130 is positioned in a main liquid flow path to face in an upstream direction. In one embodiment, the flow guidance element 70 resembles that of a scooping device.

The flow guidance element 70 establishes the inlet flow passage 72 to divert liquid from the main liquid flow path into the bladder 10. The inlet flow passage 72 is an interior cylindrical shaped passage running along the longitudinal axis of the flow-through diverter device 130. The design of the flow guidance element 70 and inlet flow passage 72 allows a high pressure water flow into the bladder 10.

Water flows out of bladder 10 via discharge inlets 74 through discharge flow passages 76. In one embodiment, the discharge flow passages 76 are arranged circumferentially around the inlet flow passage 72. In another embodiment, flow-through diverter 130 has a single annular discharge flow passage 76 surrounding inlet flow passage 72. A plurality of discharge inlets 74 all direct water into the single discharge flow passage 76. Water passes from the discharge flow passage(s) 76 into the main liquid flow path. The discharge flow passage(s) 76 need not extend as far into the main liquid flow path as inlet flow passage 72.

The upper portions of inlet flow passage 72 and the portions of flow-through diverter 130 that support discharge inlets 74 may be shaped according to a "beehive crown" design, as shown in FIG. 6. This round shape helps flexible diaphragm 14 conform to the opposite surface of bladder 10 when the bladder 10 is empty. The conforming fit of the two diaphragms when flexible diaphragm 14 is pressed against non-flexible diaphragm 12 helps ensure that all water is expelled from the bladder as it empties. Also, the "beehive crown" shape helps water initially entering empty bladder 10 to displace flexible diaphragm 14 away from non-flexible bladder 12.

One skilled in the art will recognize that flow-through diverter 130 may be used with other double-diaphragm tanks besides those disclosed herein. In addition, flow-through diverter 130 may also be used with single-diaphragm tanks.

As shown in FIG. 6, flow-through diverter 130 provides an alternative flow-through mechanism to flow-through nozzle 120. Retainer elements 80 and 82 secure flow-through diverter 130 to non-flexible diaphragm 12.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A bladder for receiving and storing a fluid in an expansion tank, comprising:
    a non-flexible diaphragm having a peripheral edge and an aperture adapted and constructed to receive a flow-through connector; and
    a flexible diaphragm having a peripheral edge,
    wherein the peripheral edges of the non-flexible diaphragm and the flexible diaphragm are sealed to one another to form a circumferential seam, and
    wherein the non-flexible diaphragm and flow-through connector at least partially define a path for fluid to flow into the bladder from the outside of the tank so that as the bladder receives fluid, the space within the bladder remains fluidically isolated from a space between the bladder and an outer shell of the expansion tank.

2. The bladder of claim 1, wherein the peripheral edges of the non-flexible diaphragm and the flexible diaphragm are heat sealed to each other.

3. The bladder of claim 1, further comprising a clench ring, wherein the peripheral edge of the non-flexible diaphragm comprises a circumferential recess and the peripheral edge of the flexible diaphragm comprises a circumferential rib, and wherein the circumferential recess meshes with the circumferential rib and the peripheral edges of the non-flexible diaphragm and the flexible diaphragm are clamped together by the clench ring.

4. An expansion tank, comprising:
    an outer shell comprising a side wall and opposite end walls;
    a flow-through connector; and
    a bladder disposed within the outer shell, the bladder comprising:
    a non-flexible diaphragm having a peripheral edge and a flexible diaphragm having a peripheral edge, the non-flexible diaphragm being positioned between the flow-through connector and the flexible diaphragm and which is connected to one of the outer shell and the flow-through connector such that the flow-through connector provides fluidic communication between an exterior of the tank and an interior of the bladder, wherein the peripheral edges of the non-flexible diaphragm and the flexible diaphragm are sealed to one another to form a circumferential seam, and wherein a space within the bladder is fluidically isolated from a space between the bladder and the outer shell.

5. The expansion tank of claim 4, wherein the flow-through connector comprises:
    a nipple having first and second ends, the first end comprising a plurality of tabs,
    wherein the tabs are manipulable between an insertion position and a securing position to secure the nipple to the bladder.

6. The expansion tank of claim 5, wherein the flow-through connector further comprises:
    a first retainer ring fixedly attached to the nipple and disposed between the bladder and the outer shell;
    a second retainer ring disposed about the nipple and within the bladder;
    a first o-ring disposed between the first retainer ring and the bladder; and
    a second o-ring disposed between the second retainer ring and the bladder,
    wherein, in the securing position, the tabs press the second retainer ring towards the first retainer ring to create a seal preventing fluidic communication between an interior of the bladder and a space between the bladder and the outer shell.

7. The expansion tank of claim 4, wherein the flow-through connector comprises:
    a central high pressure inflow channel defined by a non-rotating flow guidance element;
    at least one low pressure outflow channel disposed circumferentially about the flow guidance element; and
    a contoured cap through which water passes out of the central high pressure inflow channel into the bladder and containing a plurality of inlets into the low pressure outflow channel having a total cross sectional area less than or equal to the total cross sectional area of the inflow channel,
    wherein, when the flexible diaphragm rests against the cap, the bladder is essentially empty, and the tank is adapted and constructed to circulate water such that a first portion of water entering the tank leaves the tank before a second portion of water enters the tank.

8. The expansion tank of claim 7, wherein the plane of an inlet opening of the inflow channel is oriented perpendicular to the plane of an outlet opening of the inflow channel.

* * * * *